April 20, 1926.
R. F. BECK, JR
1,581,827
BRACE FOR BICYCLE MUD GUARDS
Filed Nov. 10, 1925
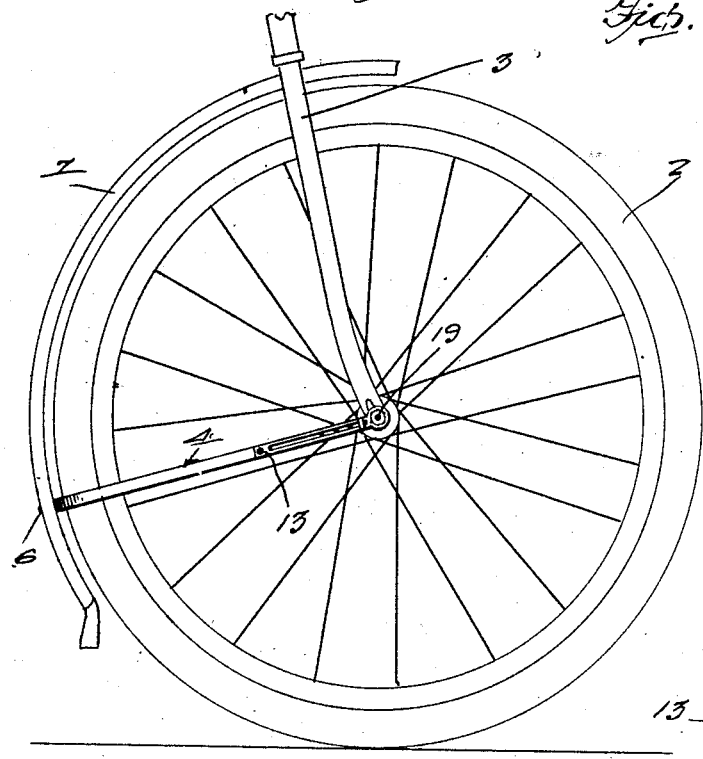
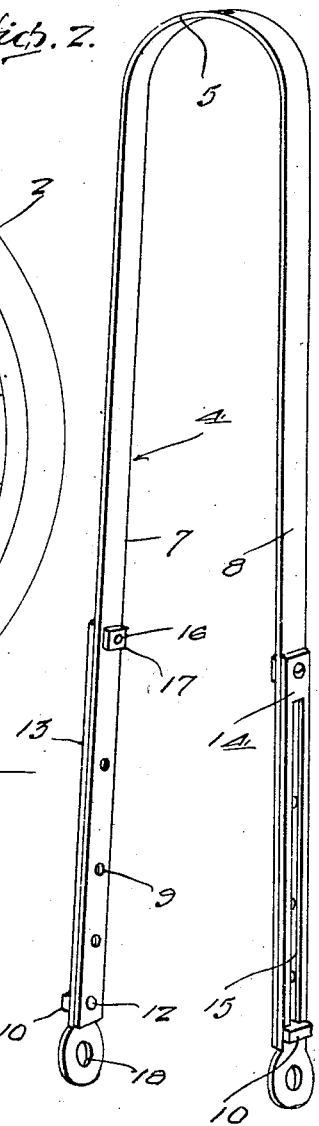
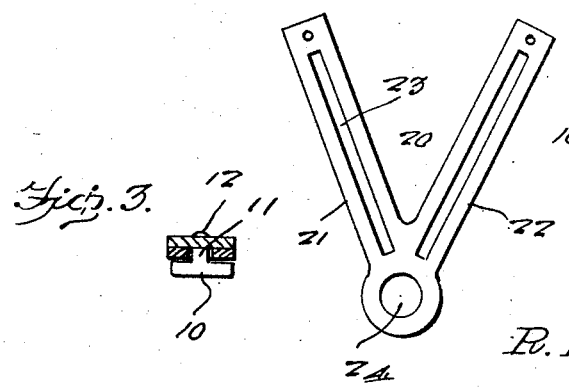
Inventor
R. F. Beck, Jr.
By Clarence A. O'Brien
Attorney Patented Apr. 20, 1926.

1,581,827

UNITED STATES PATENT OFFICE.

ROBERT F. BECK, JR., OF NEWNAN, GEORGIA.

BRACE FOR BICYCLE MUD GUARDS.

Application filed November 10, 1925. Serial No. 68,150.

*To all whom it may concern:*

Be it known that I, ROBERT F. BECK, Jr., a citizen of the United States, residing at Newnan, in the county of Coweta and State of Georgia, have invented certain new and useful Improvements in a Brace for Bicycle Mud Guards, of which the following is a specification.

This invention relates to improvements in braces for use particularly in connection with the mud guards of a bicycle.

One of the important objects of the present invention is to provide a brace which is of such construction as to adapt the same to be adjusted to various lengths depending upon the distance between the mud guards and the bicycle wheel supporting spindle, thus obviating the necessity of a bicycle shop owner having to carry a large number of mud guard braces of various sizes in stock.

A further object is to provide an adjustable brace of the above mentioned character wherein the same is of such construction as to permit the ready and easy adjustment thereof, the same being further simple in construction, inexpensive, strong and durable and further well adapted for the purpose for which it is designed.

Other objects and advantages of the invention will become apparent during the course of the following description taken in connection with the accompanying drawings.

In the accompanying drawing forming a part of this application and in which like numerals designate like parts throughout the same:

Figure 1 is a side elevation of my improved brace showing the same associated with the front mud guard of a bicycle.

Figure 2 is a perspective view of the brace.

Figure 3 is a transverse section through one of the arms, and the slidable arm associated therewith, showing the substantially inverted T-shaped member carried by the first mentioned arm, and Figure 4 is a side elevation of one of the slotted members adapted to be secured on each end of the spindle supporting the rear wheel of the bicycle.

In the drawing, wherein for the purpose of illustration is shown the preferred embodiment of my invention the numeral 1 designates generally the mud guard provided for the front wheel 2 of a bicycle. The upper portion of the mud guard is disposed through the upper portion of the front fork 3 in the usual manner and is secured thereto in the manner well known in the art.

For the purpose of supporting the lower portion of the mud guard in close spaced relation with respect to the wheel 2, I provide an adjustable brace which includes the substantially U-shaped member designated generally by the numeral 4. This U-shaped member is formed of an elongated strip of resilient flat metal, and the crown portion 5 thereof is secured to the inner side of the lower portion of the mud guard 1 as at 6. The arms 7 and 8 extend forwardly on opposite sides of the wheel 2.

A series of spaced openings 9 are provided in the forward portion of each of the arms of the U-shaped brace, and the purpose thereof will be hereinafter more fully described. A substantially T-shaped member 10 has its leg portion 11 riveted or otherwise secured to the outer side of each of the arms 7 and 8 at points adjacent the free end thereof, the securing means for the T-shaped member being shown at 12. The purpose of this member on each of the arms will also hereinafter be more fully described.

Adapted for slidable cooperation with the arms 7 and 8 of the U-shaped member 4 are the slotted arms 13 and 14 respectively. Each of these arms is formed with a flat strip of metal of the same width as the width of the arms of the U-shaped member. Each of the last mentioned arms is provided with a longitudinally extending slot 15, through which the leg or shank portions of the T-shaped members which are secured on the ends of the arms 7 and 8 are adapted to extend, the laterally extending arms of the T-shaped members being disposed over the outer faces or sides of the slotted arms in the manner clearly illustrated in Figure 3. The T-shaped members 10 and the slot 15 cooperate to provide a means for facilitating the sliding movement of the arms 13 and 14 with respect to the arms 7 and 8 respectively. A bolt and nut 16 and 17 respectively, provides a means whereby the slidable arms are adjustably secured to the arms of the U-shaped brace 4 and to this end, the inner end of each of the slotted arms is provided with a suitable opening through which the bolt 16 is adapted to extend, the bolt being further adapted to pass through one of the openings 9 formed in each of the arms of the U-shaped brace, as is more clearly illustrated in Figure 2.

An apertured ear 18 is formed on the outer end of each of the slotted arms, and these apertured ears fit over the respective ends of the spindle 19 on which the front wheel 2 is supported, it being understood of course that the outer ends of the slidable arms are disposed adjacent the outer sides of the lower bifurcated portions of the fork 3, and the usual securing nuts or the like are threaded on the outer ends of the spindle for preventing the accidental displacement of the arms from the spindle as well as preventing the wheels from becoming disengaged from the fork 3.

With the parts arranged as shown in Figure 1, a rigid brace is provided between the lower portions of the front mud guard 1, and front wheel supporting spindle so that the mud guard is rendered rigid, and is properly spaced from the wheel. The slidable arms may be moved outwardly with respect to the arms of the U-shaped brace for increasing the length of the latter to accommodate the distance between the mud guard and the wheel supporting spindle. The length of the brace will depend upon the diameter of the wheels which are mounted in the fork of a bicycle.

A similar brace is used in conjunction with the mud guard for the rear wheel of the bicycle, and in order to attach the brace to the rear spindle, there is provided a substantially V-shaped member designated generally by the numeral 20, the arms 21 and 22 respectively thereof being slotted longitudinally as at 23 for cooperation with the T-shaped members 10. It is of course understood that it is necessary to employ two of the substantially U-shaped braces 4 in connection with the mud guard for the rear wheel, the T-shaped members which are carried on the lower free ends of the arms 7 of such a pair of U-shaped braces being disposed within the slots of the arms 21 and 22 of the V-shaped member 20, while the T-shaped members on the other arms of the U-shaped braces are disposed in the slotted arms of a similar V-shaped member arranged on the other side of the rear wheel. An apertured ear 24 is formed on the apex of the V-shaped member 20 for receiving the end of the rear spindle and the usual adjusting means is associated with the V-shaped member 20 and each of the arms of the U-shaped brace 4 for adjusting the length of the braces.

It will thus be seen from the foregoing description, that an adjustable brace has been provided for the mud guards of a bicycle which will obviate the necessity of having to carry a number of braces of different sizes in stock in order to accommodate bicycles having wheels of different diameters. The simplicity in which my device is constructed enables the parts to be readily and easily adjusted, and will at all times be positive and efficient in carrying out the purposes for which it is designed.

While I have shown the preferred embodiment of my invention it is to be understood that minor changes in the size, shape and arrangement of parts may be resorted to without departing from the spirit or scope of the invention.

Having thus described the invention, what I claim is:—

1. A brace for bicycle mud guards comprising a substantially U-shaped member, the crown portion thereof being secured to the mud guard, the arms of the U-shaped member extending on opposite sides of the wheel of the bicycle, an additional pair of arms, apertured lugs formed on the outer ends of said last mentioned arms for supporting said arms on the respective ends of the wheel supporting spindle, and means for adjustably securing the free ends of the arms of the U-shaped member, and the inner ends of the additional arms.

2. A brace for bicycle mud guards comprising a substantially U-shaped member, the crown portion thereof being secured to the mud guard, the arms of the U-shaped member extending on opposite sides of the wheel of the bicycle, a pair of additional arms adapted for slidable movement on the outer free end portions of the arms of the U-shaped member, guide means for the slidable arms, means for adjustably securing the slidable arms on the arms of the U-shaped member, and apertured ears formed on the outer ends of the slidable arms for engagement with the respective ends of the wheel supporting spindle.

3. A brace for bicycle mud guards comprising a substantially U-shaped member having its crown portion secured to the mud guard, the arms of the U-shaped member being disposed on opposite sides of the wheel of the bicycle, an additional pair of arms slidably disposed on the outer sides of the free end portions of the respective arms of the U-shaped member, said additional arms being slotted longitudinally, guide means carried by the free ends of the arms of the U-shaped member extending through the slots of the respective additional arms, means for adjustably securing the inner ends of the additional arms on the respective arms of the U-shaped member, and an apertured ear formed on the opposite end of each of the additional arms for engagement with the respective ends of the wheel supporting spindle.

In testimony whereof I affix my signature.

ROBERT F. BECK, Jr.